Dec. 6, 1960  R. S. BROOKMAN ET AL  2,963,109
CENTRIFUGAL TYPE SEPARATING APPARATUS
Filed Feb. 11, 1957  6 Sheets-Sheet 5

INVENTORS
Roger S. Brookman
Charles L. Maisch
BY
Popp and Sommer
ATTORNEYS

United States Patent Office 2,963,109
Patented Dec. 6, 1960

2,963,109

CENTRIFUGAL TYPE SEPARATING APPARATUS

Roger S. Brookman, R.D. 3, Lapham Road, East Aurora, N.Y., and Charles L. Maisch, 26 Wade Ave., Buffalo, N.Y.

Filed Feb. 11, 1957, Ser. No. 639,501

9 Claims. (Cl. 183—5)

This invention relates to apparatus for separating particles of small size from a gas in which they are suspended.

There are known types of separators, such as cloth filters and electrostatic separators, for cleaning gas laden with fine particles of the size with which the present invention is concerned, but such types of separators while efficient enough have certain practical disadvantages in the respects of requiring periodic cleaning or washing, being unable to handle particle laden gas at elevated temperatures, and so on. On the other hand, mechanical separators, operating on centrifugal action to separate the particles from the gas, while eliminating the aforementioned disadvantages of the other types of separators, are notoriously inefficient when handling particles of small size.

It is the primary object of the present invention to provide a mechanical type separator which has high separating efficiency when cleaning gas laden with fine particles.

Other objects and advantages will be apparent from the following detailed description and accompanying drawings in which.

Referring to the form of the invention shown in Figs. 1–9, the apparatus is shown as comprising a plurality of centrifugal separators or tubes, each represented generally by the numeral 20, arranged horizontally one above another in two transversely spaced banks or tiers. Five separators 20 are shown in each bank or tier, although any number may be employed.

Figures 1, 9:
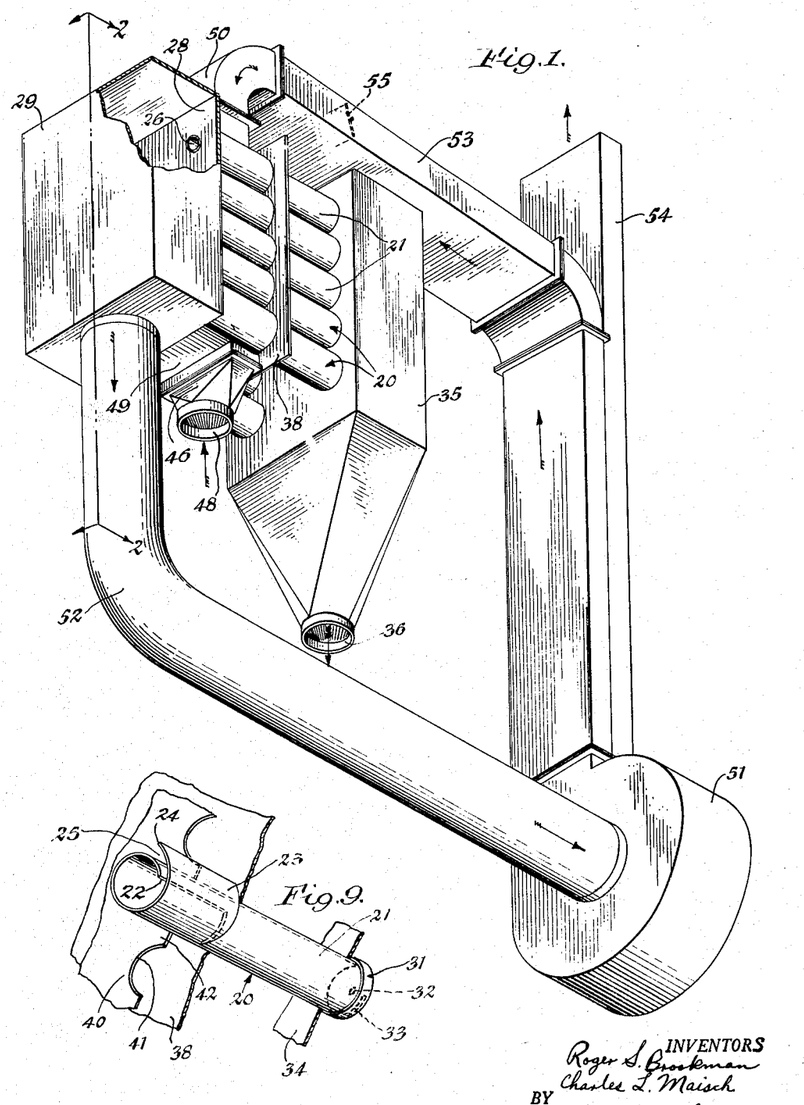
Fig. 1 is a perspective view of apparatus embodying one form of the present invention.
Fig. 9 is a perspective view of a single tube including the form illustrated in Figs. 1–8, with associated parts being illustrated fragmentarily.
Figure 2:
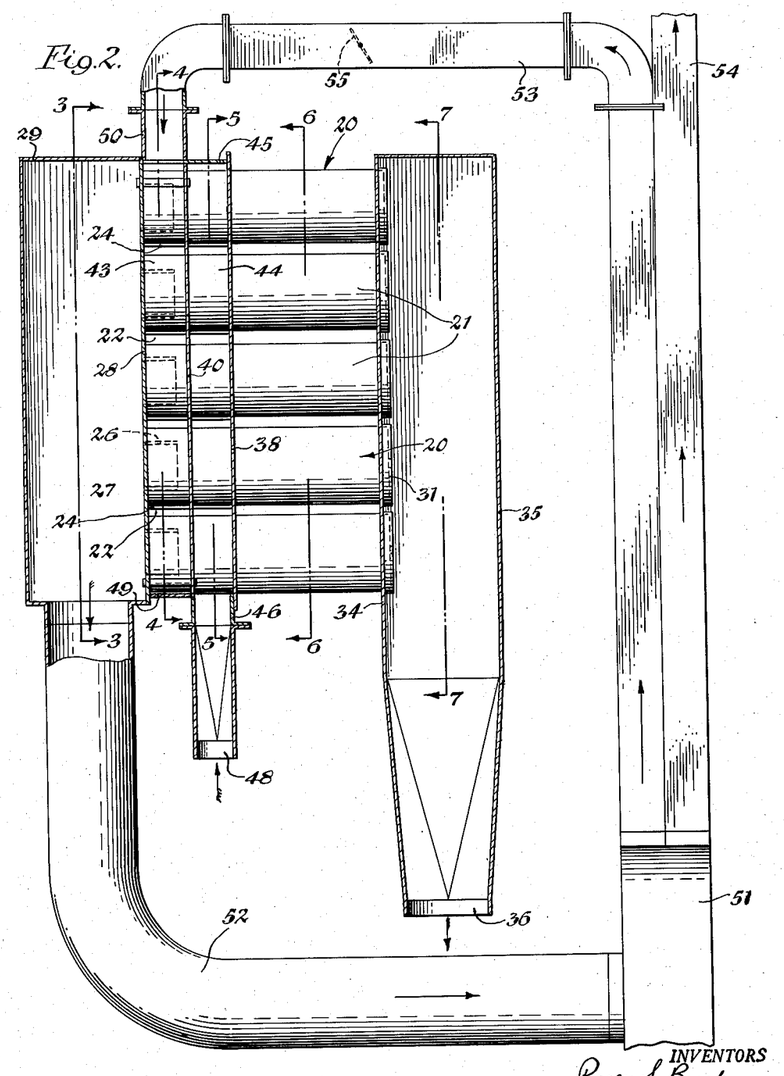
Fig. 2 is a side elevational view thereof with certain parts being shown in section as taken along the line 2—2, Fig. 1.

As best illustrated in Fig. 9, each separator 20 is shown as having a cylindrical tubular body 21, provided with a rectangular opening 22 in its side wall extending axially from one end to a point short of the other end, actually less than half the axial length of the body, and having a circumferential extent or width of about 90 degrees. A rectangularly outlined volute or scroll-shaped inlet wall member 23 covers the opening 22, fairing into one axial edge of this opening along its full length and gradually extending radially outwardly therefrom along a circumferential direction and terminating in a free edge 24 spaced about diametrically opposite from the aforesaid axial edge of the opening 22. The volute wall member 23 defines the outer contour of a generally tangential inlet passage 25 leading to the opening 22.

A cylindrical outlet pipe 26 for cleaned gas projects centrally and coaxially into that end of each of the tubular bodies 21 provided with the opening 22. One such pipe 26 is provided for each body 21. At their outer ends the outlet pipes 26 are mounted in openings in a tube sheet 28 which forms the inner wall of a box-like casing 29. The casing 29 and tube sheet 28 define a receiving chamber 27 for cleaned gas. The inner end of each outlet pipe 26 is shown as being arranged less than half way of the axial length of the opening 22 in the tubular body 21. Thus an annular space 30 is provided between the outlet pipe 26 and the surrounding tubular body 21.

Figures 3, 4, 5:
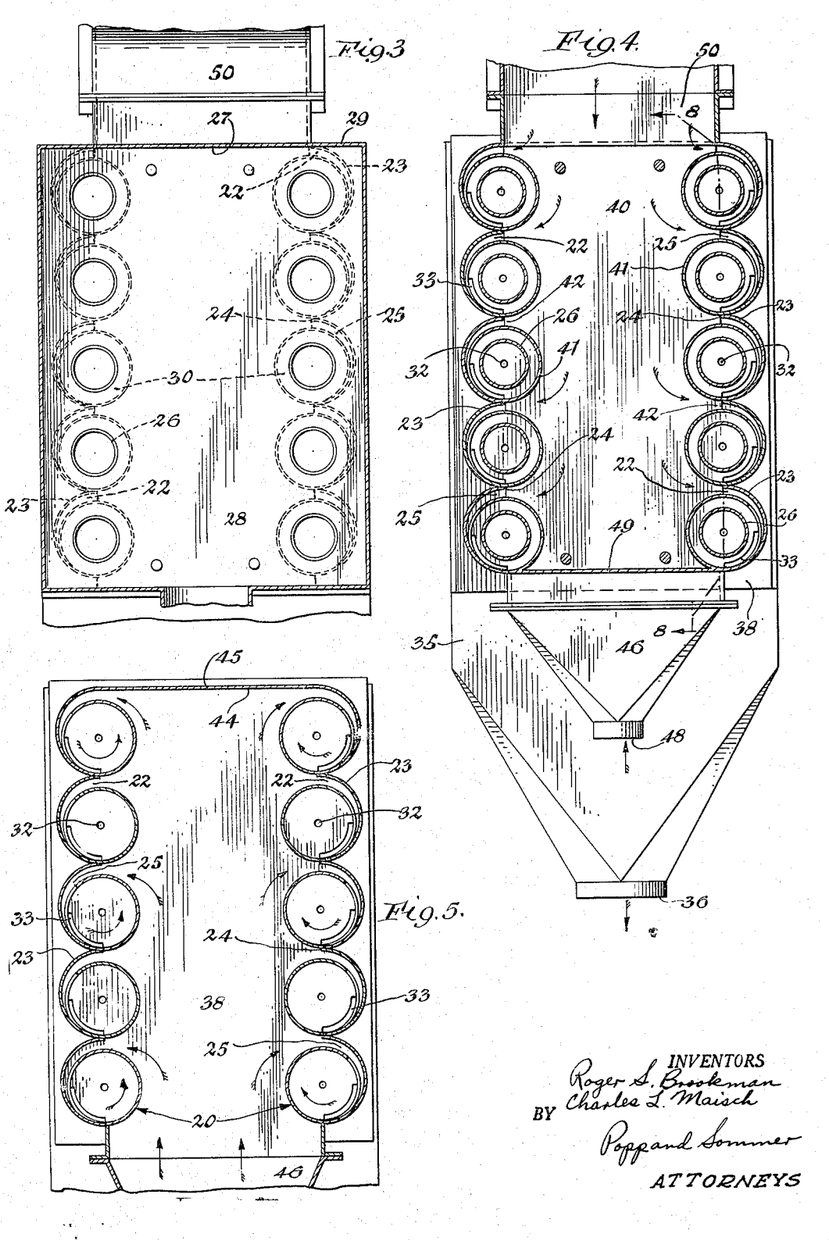
Figs. 3, 4, 5, 6 and 7 are vertical transverse fragmentary sectional views thereof taken on the correspondingly numbered lines in Fig. 2.
Figure 6:
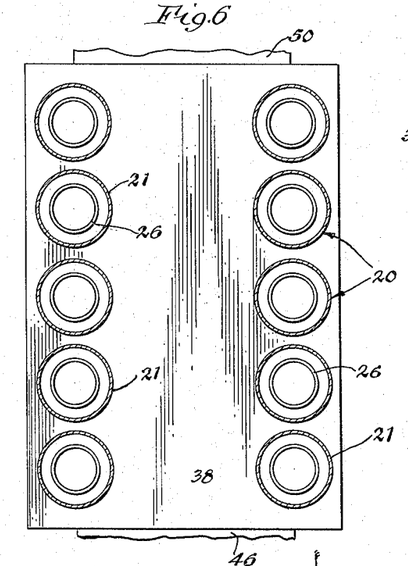
Figure 7:
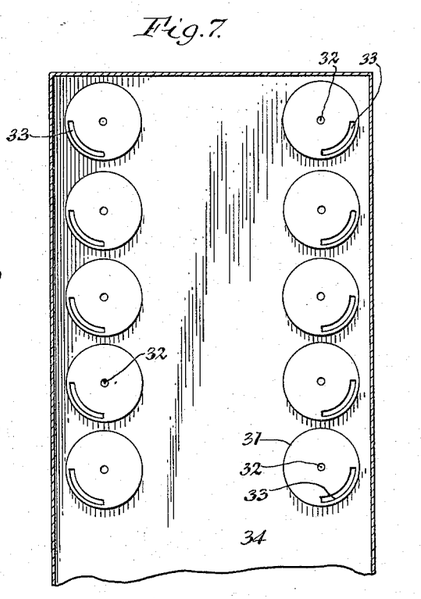
Figure 8:
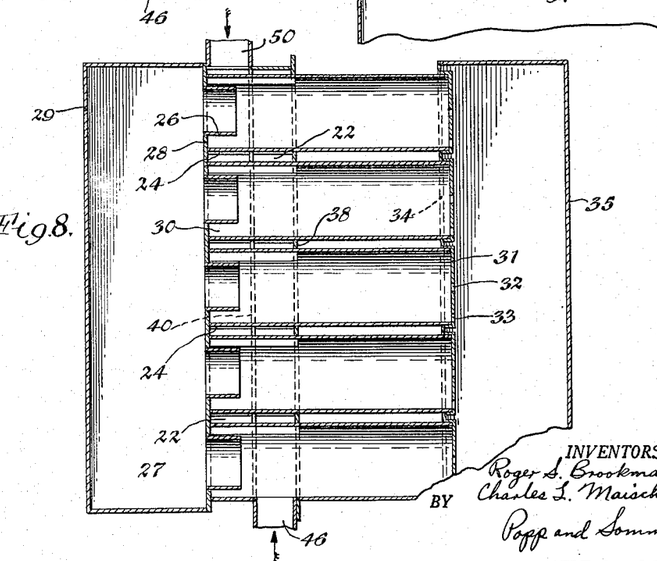
Fig. 8 is a vertical longitudinal fragmentary sectional view thereof taken generally on line 8—8, Fig. 4.

It is to be noted that the tube sheet 28 engages the corresponding end faces of tubular bodies 21 and inlet volute wall members 23 (Fig. 2) and closes off the outer end of each of the annular spaces 30 as well as of each of the inlet passages 25 (Fig. 3). Thus the tube sheet 28 serves as an end wall for each separator 20.

At the other ends of the bodies 21, each is provided with an end head 31 having a central hole 32 through which gas can move and an arcuate outlet aperture 33 adjacent the side wall of the body for separated particles. These ends of the separators project through openings provided in a tube sheet 34 (Figs. 2, 7 and 8) which forms the inner wall of a hopper 35 having an outlet 36. Separated particles are discharged through the several outlet apertures 33 into the hopper 35. This outlet 36 is normally closed by any suitable means (not shown) and preferably arranged to permit the withdrawal of the collected particles.

The inner ends or sides of the inlet passages 25 are closed by a transverse sheet 38 which is provided with openings through which the tubular bodies 21 severally extend. The inner end faces of the volute wall members 23 engage the sheet 38.

Referring to Fig. 5, it will be noted that the separators 20 in each bank or tier are arranged so that the entrances to the inlet passages 25 face inwardly of the apparatus or normal to an intermediate vertical longitudinal plane. It will also be observed that the free or inlet end of each volute wall member 23 engages generally tangentially the tubular body 21 of the next higher separator. Thus the wall members 23 form continuous scalloped side walls on opposite sides of the apparatus when viewed from the exterior thereof.

Intermediate the axially spaced and parallel sheets 28 and 38 is a vertical transverse partition sheet 40. This sheet 40 is arranged between the two banks or tiers of separators 20. The opposite lateral edges of the sheet 40 are provided with semi-cylindrical recesses 41 one for each tubular body 21 so as to embrace the same as best shown in Fig. 9. Between adjacent recesses is a lip 42 which abuts the free edge 24 of the corresponding scroll-shaped wall member 23 as shown in Fig. 4. Thus the space between the two sheets 28 and 38 is divided into two compartments 43 and 44, the compartment 43 between the sheets 28 and 40 being adapted to receive substantially particle free gas or cleaned gas, and the compartment 44 between the sheets 40 and 38 being adapted to receive particle laden gas to be cleaned.

The compartment 44 is shown as closed at its top by a top wall 45 which connects the free edges 24 of the two topmost and opposite separators 20 (Fig. 5). At its bottom this compartment 44 is provided with an inlet duct 46 having an inlet 48 for particle laden gas to be cleaned.

The compartment 43 is shown as closed at its bottom by a bottom wall 49 which extends transversely between the two lower-most tubular bodies 21 (Fig. 4). At its top this compartment 43 is provided with an inlet duct 50 for receiving substantially particle free gas or cleaned gas.

As shown, means are provided for recirculating a part of the cleaned gas by introducing it into the inlet duct 50. For this purpose there is provided a driven fan 51 of any suitable type and having its inlet connected to the casing 29 and communicating with the chamber 27 by a duct 52. The outlet of the fan is shown as connected to two outlet ducts 53 and 54. The duct 53 connects with the inlet duct 50 and the duct 54 may exhaust to the atmosphere or a secondary separator (not shown) as desired. In this manner, a portion of cleaned gas can be bled off and fed back into the centrifugal separators 20. A damper 55 is shown as arranged in the duct 53 for regulating the flow of bleed-in air into the inlet duct 50. Preferably the damper 55 is so adjusted that the volume of bleed-in air supplied to the inlet duct 50 for the chamber 43 is about the same as the volume of the particle laden gas supplied to the inlet duct 46 for the chamber 44.

In the operation of the embodiment shown in Figs. 1-9, particle laden gas to be cleaned is introduced into the compartment 44 through the inlet 48 under a forced or induced draft. From this compartment the particle laden gas enters the tangential inlet passages 25 of the various separators which conduct the gas into the respective tubular bodies 21. This produces a cyclonic action within these bodies. Centrifugal force acting upon the particles causes them to move radially outwardly toward the inner surface of the body wall. An outer vortex spiraling toward the end head 31 conveys the concentrated particles to be discharged through the outlet aperture 33 into the hopper 35. Any gas discharged into the hopper can reenter the tubular body through the central hole 32. An inner vortex spiraling toward the opposite end of the tubular body will move the central core of relatively particle free or cleaned gas into the outlet tube 26 and thence discharge it into the chamber 27. Part of this cleaned gas is recirculated through the separators by introducing it into the compartment 43 through the inlet duct 50. From the compartment 43 the cleaned gas enters the tangential inlet passages 25 alongside the particle laden gas entering from the adjacent compartment 44.

It has been found that introducing substantially particle free gas side by side with particle laden gas is effective in improving the separating efficiency, provided certain conditions are observed.

First, it is essential that the substantially particle free gas is introduced adjacent the end wall having the outlet pipe 26. The same advantages will not be achieved by introducing the particle laden gas to be cleaned at this location. In other words, the materials handled by the compartments 43 and 44 cannot be reversed if the higher efficiency is to be attained.

Second, it is essential that the inner end of the outlet pipe 26 be not located as far inwardly as the inner margin of the path of the substantially particle free gas at the place of merging the two streams. In other words, the axial length of the outlet pipe within the tubular body 21 must be less than the spacing between the sheets 28 and 40.

Third, it is essential that the gas streams have contact with each other before they reach the opening 22 to the tubular body 21. If the lip 42 is extended to the plane of the opening 22, a lower separation efficiency results.

From the foregoing, it will be seen that the tangential inlet passage 25 must be divided into two entrance portions remote from the actual opening 22 into the tubular body by a transverse member arranged axially relative to the tubular body inwardly of the inner end of the outlet pipe 26, with substantially particle free gas being supplied to that entrance portion adjacent the end wall on which said outlet pipe is mounted, and with the particle laden gas to be cleaned being supplied to the other entrance portion which is axially inwardly of the inner end of said outlet pipe.

While the arrangement shown in Figs. 1-9 includes apparatus for recirculating part of the cleaned gas which is substantially particle free and referred to as bleed-in air, it is to be understood that instead a completely independently supplied substantially particle free gas may be employed.

Figure 14:
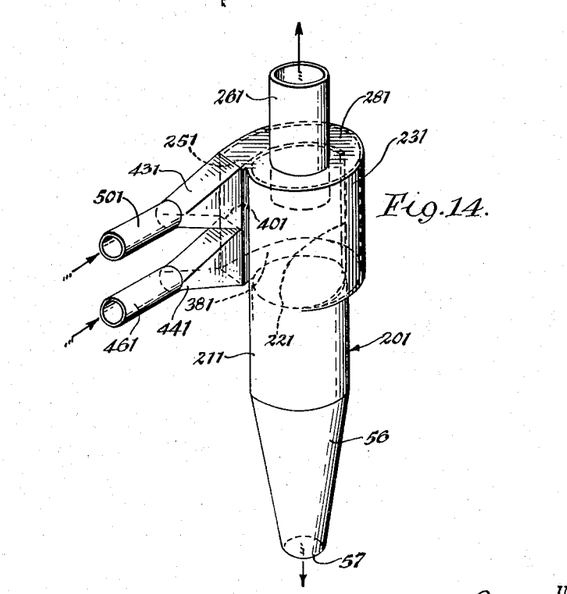
Fig. 14 is a perspective view of a single tube embodying another modified form of the present invention.

Likewise, it is to be understood that the specific configuration of the centrifugal separator or tube 20 shown in Figs. 1-9 may be varied without departing from our teaching. For example, that end of the tubular body from which the separated particles are discharged may be formed in the manner of the conventional cyclone, having a frusto-conical end section 56 with central outlet 57 as shown in Fig. 14, instead of a continuous cylindrical body with end head 31 having the openings 32 and 33 therein as shown in Figs. 1-9. Referring to Fig. 14, the cylindrical body section of the separator 201 is indicated at 211 and has an opening 221 therein covered by a volute or scroll-shaped inlet wall 231 with end walls 281 and 381 to provide an inlet passage 251. An outlet pipe 261 is mounted in an opening in the end wall 281 so as to provide an annular space within the tube. The entrance to the inlet passage 251 is shown as divided into two portions of about equal area by a member indicated at 401 jointly provided by the mergence of the opposing walls of two diverging transition sections 431 and 441 connected respectively with inlet ducts 501 and 461. The inner end of the outlet pipe 261 is arranged axially between the dividing member 401 and the end wall 281.

The operation of the separator 201 is similar to that described for the centrifugal separator 20. Thus substantially particle free gas is introduced through the inlet duct 501 and particle laden gas to be cleaned is introduced through the inlet duct 461. Cleaned gas is discharged through the outlet pipe 261 and separated particles are discharged through the outlet 57.

Figure 10:
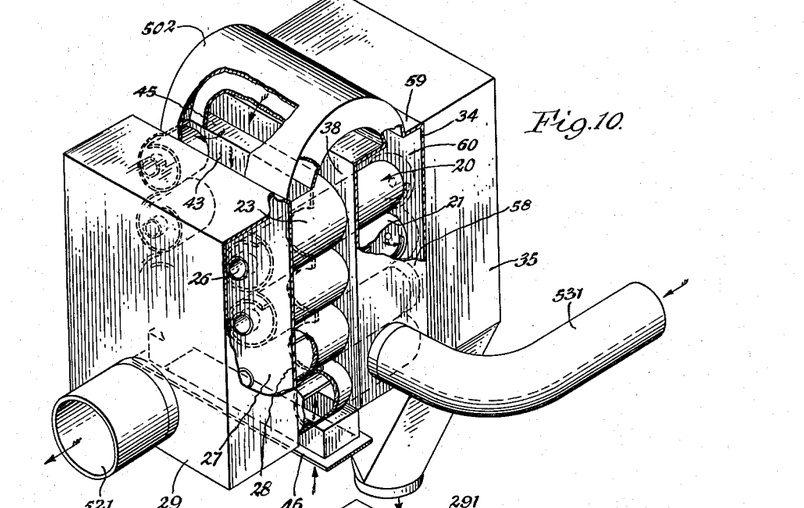
Fig. 10 is a perspective view of another apparatus embodying a modified form of the present invention, portions of certain parts being broken away in order to expose other parts.

Another horizontal arrangement of centrifugal separators 20 is shown in Fig. 10. The apparatus there shown is similar to that of Figs. 1-9, except that the bleed-in air or substantially particle free gas is first allowed to pass around the exteriors of the tail portions of the tubular bodies 21. Hence, similar reference numerals ares used to indicate like parts. The space between the tube sheets 38 and 34 is enclosed by side, bottom and top walls, one of the side walls being shown at 58 and the top wall at 59, to provide a chamber 60. This chamber has an inlet duct 531 connected to one side wall 58 and an outlet duct 502 connected to the top wall 59. The downstream end of the outlet duct 502 connects with the chamber 43. Thus, bleed-in air or substantially particle free gas enters the chamber 60 through duct 531, flows around the portions of the tubular bodies 20 within this chamber, leaves through the duct 502 and thence enters the chamber 43. In this manner the bleed-in air or substantially particle free gas can be brought in heat exchange relationship with the tubular bodies 20. This has particular advantage in handling hot gases in that condensation within the tubular bodies is minimized.

In Fig. 10, the outlet duct for the receiving chamber 27 for cleaned gas is indicated at 521. It will be understood that this duct 521 can be connected with the inlet of an exhaust fan (similar to 51 in Fig. 1) and the duct 531 connected to the fan's outlet.

Figure 11:
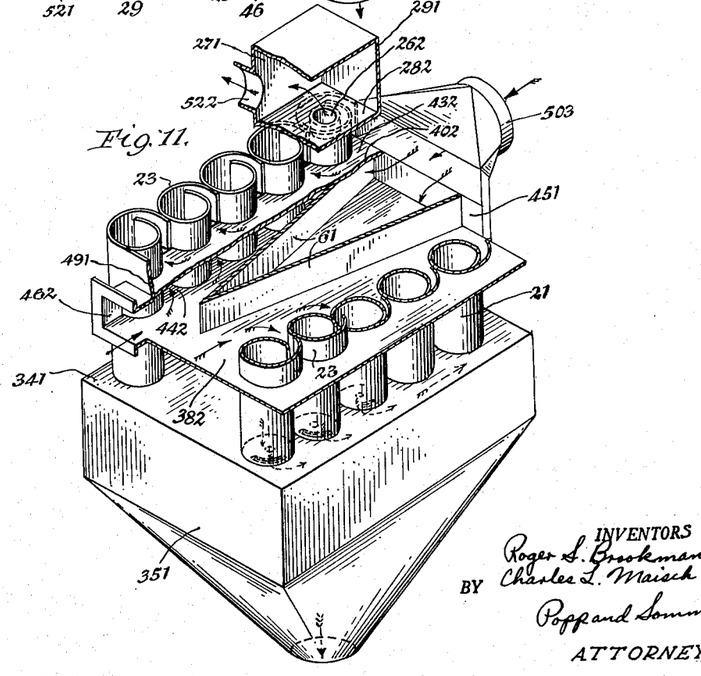
Fig. 11 is a perspective view of still another apparatus embodying a further modified form of the present invention, portions of certain parts being broken away in order to expose other parts.

Still another arrangement of centrifugal separators 20 is shown in Fig. 11 but with the separators arranged vertically. The lower ends of the tubular bodies 21 of these separators are mounted on a horizontal bottom tube sheet 341 below which a hopper 351 is arranged. The upper ends of the tubular bodies 21 are closed by a horizontal top tube sheet 282 on which the outlet pipes 262 are mounted. The top tube sheet 282 is shown as covered by a box-like casing 291 to provide a receiving chamber 271 for cleaned gas emitted by the pipes 262. The chamber 271 has an outlet duct 522. At the lower ends of the volute or scroll-shaped inlet walls 23 is a horizontal tube sheet 382. Spaced between the tube sheets 382 and 282 is a horizontal partition sheet 402 thereby providing two compartments 432 and 442. The upper compartment 432 at one end is shown as having an inlet duct 503 for introducing bleed-in air or substantially particle free gas, and at the same end the lower compartment 442 is closed by a vertical end wall 451. At the opposite end the lower compartment 442 is shown as having an inlet duct 462 for introducing particle laden gas to be cleaned, and at the same end the upper compartment 432 is closed by a vertical end wall 491. Arranged within the lower compartment 442, there is shown a pair of vertical baffle plates 61 extending convergently from the end wall 451 and joined at their opposite ends adjacent the inlet duct 462. The purpose of the baffle plates 61 is to maintain a uniform velocity for the particle laden gas after it enters the lower compartment 442 in order to prevent the particles from settling out on the floor of this compartment.

Except for a vertical instead of horizontal orientation of the centrifugal separators 20 in Fig. 11, the apparatus operates the same as that shown in Figs. 1–9.

Figure 12:
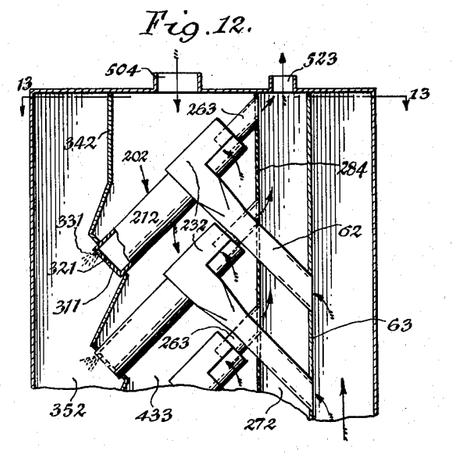
Fig. 12 is a vertical sectional view through yet another apparatus embodying still a further modified form of the present invention.
Figure 13:
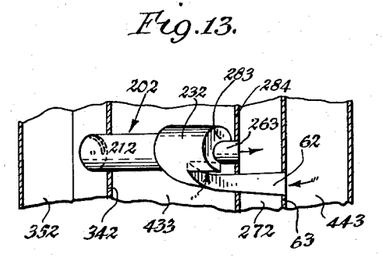
Fig. 13 is a horizontal fragmentary sectional view thereof taken on line 13—13, Fig. 12.

In Figs. 12 and 13 there is shown still a further arrangement of centrifugal separators but still embodying the bleed-in feature of the present invention. The centrifugal separators 202 are severally similar to those shown in Figs. 1–11 so far as having a tubular body 212, end head 311 with central hole 321 and arcuate outlet aperture 331, and volute or scroll-shaped outer wall member 232 which covers an opening in the wall of the tubular body remote from the said end head. An end wall closes the inner end of the inlet passage defined by the volute wall 232 and an end wall 283 closes the outer end of this passage. Mounted on the end wall 283 and projecting partially into the tubular body 212 is an outlet pipe 263.

The separators 202 are shown as arranged in vertically spaced banks or tiers with their longitudinal axes at an angle to the horizontal, between spaced vertical tube sheets 342 and 284. The tube sheet 342 is shown as stepped to provide sections through which the lower ends of the tubular bodies extend severally at right angles thereto. The bodies extend through circular holes provided in the steps of the tube sheet 342 which forms the inner wall of a hopper 352 for receiving the separated particles from the tubes.

The outer ends of the outlet pipes 263 are mounted severally in openings provided in the tube sheet 284. The space between the tube sheets 284 and 342 is enclosed to provide a compartment 433 adapted to receive bleed-in air or substantially particle free gas, through an inlet duct 504. Such bleed-in air can enter the tubular bodies 212 through the outer entrance portion to the corresponding inlet passage defined by the volute wall member 232 and end wall 283. The inner entrance portion to each said inlet passage communicates with one end of an inlet duct 62 for particle laden gas. The other ends of the inlet ducts 62 are mounted in openings provided in a vertical tube sheet 63 which is spaced laterally outwardly from the tube sheet 284. The inlet ducts 62 pass through sealed openings in the tube sheet 284.

The space between the tube sheets 284 and 63 is enclosed to provide a receiving chamber 272 for cleaned gas discharged by the outlet pipes 263. The chamber 272 has an outlet duct 523. The tube sheet 63 forms the inner wall of a compartment 443 to which particle laden gas to be cleaned is supplied in any suitable manner.

In the operation of the apparatus shown in Figs. 12 and 13, particle laden gas to be cleaned is supplied to the compartment 443 from whence it flows into the inlet ducts 62 and thence tangentially into the tubes 212. At the same time, bleed-in air or substantially particle free gas is introduced into the compartment 433 from whence it flows tangentially into the tubes 212 between the inlet ducts 62 and end walls 283. Within the tubes 212, the particles are separated from the gas by centrifugal action, the separated particles being discharged through the apertures 331 into the hopper 352, and the cleaned gas being discharged through the outlet pipes 263 into the chamber 272.

Other arrangements of centrifugal separators having the bleed-in feature will readily occur to those skilled in the art and the specific embodiments shown are therefore intended as illustrative rather than limitative of the present invention.

Apparatus embodying the present invention is intended principally for handling fine, difficult to separate dust particles which justify the use of additional power using mechanical apparatus, as distinguished from other types of separators which have drawbacks such as build-up, inability to handle products at elevated temperatures or which present cleaning problems.

We claim:

1. In apparatus for separating suspended particles from gas, the combination comprising a tubular body having an outlet at one end for the separated particles, an outlet pipe for the cleaned gas at the other end of said body and projecting thereinto to provide an annular space between said outlet pipe and body, an end wall between said outlet pipe and body and closing off the outer end of said annular space, said body having an opening extending axially thereof from said end wall to a point beyond the inner end of said outlet pipe, means providing a single scroll shaped inlet passage leading to said opening, a member extending transversely of the entrance to said passage at an axial position related to said body arranged between said inner end of said outlet pipe and said one end of said body and dividing said entrance into two portions, means for supplying substantially particle free gas to that one of said entrance portions adjacent said end wall, and means for supplying particle laden gas to be cleaned to the other of said entrance portions.

2. In apparatus for separating suspended particles from gas, the combination comprising a tubular body having an outlet at one end for the separated particles, an outlet pipe for the cleaned gas at the other end of said body and projecting thereinto to provide an annular space between said outlet pipe and body, an end wall between said outlet pipe and body and closing off the outer end of said annular space, said body having an opening extending axially thereof from said end wall to a point beyond the inner end of said outlet pipe, means providing a single scroll shaped inlet passage leading to said opening, a member extending transversely of the entrance to said passage at an axial position related to said body arranged between said inner end of said outlet pipe and said one end of said body and dividing said entrance into two portions substantially equal to each other in area, means for supplying substantially particle free gas to that one of said entrance portions adjacent said end wall, and means for supplying particle laden gas to be cleaned to the other of said entrance portions.

3. In apparatus for separating suspended particles from gas by centrifugal action, the combination comprising a cylindrical tubular body having an opening in its side wall extending axially thereof from one end to a point short of the other end, a cylindrical outlet pipe for the cleaned gas at said one end of said body and projecting centrally and coaxially thereinto to provide an annular space between said outlet pipe and body, the inner end of said outlet pipe being arranged less than half way of the axial length of said opening, an end wall between said outlet pipe and body and closing off the outer end of said annular space, a scroll shaped wall member defining a single inlet passage leading to said opening, a member extending transversely of the entrance to said passage and dividing said entrance into two portions substantially equal to each other in area, means for supplying substantially particle free gas to that one of said entrance portions adjacent said end wall, and means for supplying particle laden gas to be cleaned to the other of said entrance portions.

4. In apparatus for separating suspended particles from gas, the combination comprising a tubular body having an outlet at one end for the separated aprticles, an outlet pipe for the cleaned gas at the other end of said body and projecting thereinto to provide an annular space between said outlet pipe and body, an end wall between said outlet pipe and body and closing off the outer end of said annular space, said body having an opening extending axially thereof from said end wall to a point beyond the inner end of said outlet pipe, means providing a single scroll shaped inlet passage leading to said opening, a member extending transversely of the entrance to said passage at an axial position related to said body arranged between said inner end of said outlet pipe and said one end of said body and dividing said entrance into two portions, means for supplying a part of the cleaned gas discharged from said outlet pipe to that one of said entrance portions adjacent said end wall, and means for supplying particle laden gas to be cleaned to the other of said entrance portions.

5. In apparatus for separating suspended particles from gas, the combination comprising at least a pair of spaced tubular bodies each of which has an outlet at one end for the separated particles and an opening extending axially of said body from the opposite end partway of the length thereof, a rectangularly outlined scroll-shaped inlet wall member for each of said openings and covering the same and gradually extending radially outwardly in a circumferential direction from one axial edge of said opening along its full length and terminating in a free edge remote from said axial edge, a first tube sheet engaging the end faces of said bodies provided with said openings and engaging the outer end faces of said members, a second tube sheet engaging the inner end faces of said members, a partition sheet intermediate said tube sheets and abutting said free edges to provide two portions to the entrance to each scroll-shaped inlet passage defined by the corresponding one of said members and tube sheets, an outlet pipe for each of said bodies and mounted on said first tube sheet and projecting into said body to provide an annular space therebetween, the inner end of each of said outlet pipes being arranged in a plane intermediate said first tube sheet and partition sheet, means for supplying substantially particle free gas to the space between said first tube sheet and partition sheet, and means for supplying particle laden gas to be cleaned to the space between said partition sheet and second tube sheet.

6. In apparatus for separating suspended particles from gas, the combination comprising a plurality of centrifugal separators arranged in two spaced rows, each of said separators including a tubular body having an outlet at one end for separated particles and at its other end in the side wall thereof a rectangular opening, a rectangularly outlined scroll-shaped inlet wall member for each of said openings and covering the same and beginning at one axial edge of said opening and terminating in a free end remote from said axial edge, the separators in each of said rows being oriented similarly with the said free end of each of such separators engaging the tubular body of an adjacent one of such separators so as to provide a continuous wall, the free edges of said members of the separators in one of said rows facing those in the other of said rows, a first tube sheet engaging the axially facing ends of said bodies provided with said openings and also engaging the outer axially facing ends of said members, a second tube sheet engaging the inner axially facing ends of said members, a partition sheet intermediate said rows and tube sheets and having scalloped side edges embracing said bodies and providing lip portions which abut said free edges thereby to divide the entrance to each scroll-shaped inlet passage defined by the corresponding one of said members and said tube sheets into two entrance portions, an outlet pipe for each of said bodies and mounted on said first tube sheet and projecting into said body to provide an annular space therebetween, the inner end of each of said outlet pipes being arranged in a plane intermediate said first tube sheet and partition sheet, means for supplying substantially particle free gas to the space between said first tube sheet and partition sheet, and means for supplying particle laden gas to be cleaned to the space between said partition sheet and second tube sheet.

7. In apparatus for separating suspended particles from gas, the combination comprising a tubular body having an outlet at one end for the separated particles, an outlet pipe for the cleaned gas at the other end of said body and projecting thereinto to provide an annular space between said outlet pipe and body, an end wall between said outlet pipe and body and closing off the outer end of said annular space, first inlet means for introducing particle laden gas to be cleaned generally tangentially into said body intermediate the inner end of said outlet pipe and said one end of said body, means for passing substantially particle free gas around the exterior of said body between said first inlet means and said one end of said body, and second inlet means for introducing said substantially particle free gas after it has passed around the exterior of said body as aforesaid generally tangentially into said body intermediate said first inlet means and end wall.

8. In apparatus for separating suspended particles from gas, the combination comprising a plurality of centrifugal separators, each of said separators including a tubular body having an outlet at one end for separated particles and at its other end in the side wall thereof an opening, means providing a scroll-shaped inlet passage leading to each of said openings, means dividing the entrance to each of said inlet passages into two entrance portions axially side by side, an outlet pipe for each of said bodies and projecting axially thereinto from the end thereof provided with said opening and terminating short of the transverse plane of the division between said entrance portions, means providing a first compartment communicating with the outer one of said entrance portions for each of said bodies, means providing a second compartment communicating with the inner one of said entrance portions, means providing a third compartment housing those portions of said bodies between said outer entrance portions and said one ends of said bodies, means establishing communication between said first and third compartments, means for supplying substantially particle free gas to said third compartment, and means for supplying particle laden gas to be cleaned to said second compartment.

9. In apparatus for separating suspended particles from gas, the combination comprising means providing a first compartment including spaced tube sheets, means providing a second compartment, a plurality of centrifugal separators arranged in said first compartment, each of said separators having a tubular body mounted at one end on one of said tube sheets and having an outlet at said one end for discharging separated particles exteriorly of both of said compartments, an outlet pipe for each of said bodies and projecting partially thereinto from the end thereof opposite from said one end, the outer ends of said outlet pipes being mounted on the other of said tube sheets and communicating with said second compartment for discharging cleaned gas thereinto, each of said bodies having an opening in the side wall thereof at said opposite end, means providing a scroll-shaped inlet passage leading to each of said openings, means dividing the entrance to each of said inlet passages into two entrance portions axially side by side, the outer one of said entrance portions for each of said bodies communicating with said first compartment, an inlet duct for each of said bodies and communicating at one end with the corresponding inner one of said entrance portions and extending exteriorly of both of said compartments, means for supplying substantially particle free gas to said first compartment, and means for supplying particle laden gas to be cleaned to said inlet ducts.

References Cited in the file of this patent

UNITED STATES PATENTS

| | | |
|---|---|---|
| 1,668,872 | Schutz | May 8, 1928 |
| 1,811,597 | Steinbart | June 23, 1931 |
| 1,930,806 | Horne et al. | Oct. 17, 1933 |
| 2,039,115 | Reif | Apr. 28, 1936 |
| 2,339,416 | McDonald | Jan. 18, 1944 |
| 2,347,731 | Boivie | May 2, 1944 |
| 2,471,326 | Hoyt | May 24, 1949 |
| 2,799,354 | Borey | July 16, 1957 |
| 2,869,677 | Yellott et al. | Jan. 20, 1959 |

FOREIGN PATENTS

| | | |
|---|---|---|
| 32,647 | Austria | Apr. 25, 1908 |
| 875,753 | Germany | May 7, 1953 |